US012795762B2

(12) United States Patent
Hart et al.

(10) Patent No.: US 12,795,762 B2
(45) Date of Patent: Nov. 10, 2026

(54) JOINT TRANSMISSION FOR ENHANCED DIVERSITY AND RELIABILITY

(71) Applicant: Cisco Technology, Inc., San Jose, CA (US)

(72) Inventors: Brian Donald Hart, Sunnyvale, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 18/593,690

(22) Filed: Mar. 1, 2024

(65) Prior Publication Data

US 2024/0298213 A1 Sep. 5, 2024

Related U.S. Application Data

(60) Provisional application No. 63/487,778, filed on Mar. 1, 2023.

(51) Int. Cl.
*H04W 76/15* (2018.01)
*H04W 28/06* (2009.01)
(Continued)

(52) U.S. Cl.
CPC ......... *H04W 76/15* (2018.02); *H04W 28/065* (2013.01); *H04W 48/16* (2013.01); *H04W 84/12* (2013.01)

(58) Field of Classification Search
CPC ... H04W 76/15; H04W 28/065; H04W 48/16; H04W 84/12
See application file for complete search history.

(56) References Cited

U.S. PATENT DOCUMENTS

2015/0249936 A1* 9/2015 Chen ..................... H04L 1/0006 370/329
2018/0263047 A1* 9/2018 Kim ..................... H04L 69/324
(Continued)

FOREIGN PATENT DOCUMENTS

GB 2596870 A 1/2022

OTHER PUBLICATIONS

International Search Report and Written Opinion; PCT Application No. PCT/US2024/018247, dated Jul. 4, 2024, 17 pages.
(Continued)

*Primary Examiner* — Jael M Ulysse
(74) *Attorney, Agent, or Firm* — Polsinelli P.C.

(57) ABSTRACT

Method, system, and/or computer readable medium for establishing an upper upper medium access controller (upper UMAC); establishing a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmitting one or more proto-medium access controller protocol data units (proto-MPDUs) from the upper UMAC to the plurality of AP actors; attaching PHY and MAC metadata to the one or more proto-MPDUs; and forming, at each of the plurality of AP actors, a PHY protocol data unit (PPDU), wherein each PPDU is formed from a corresponding one of the one or more proto-MPDUs.

20 Claims, 9 Drawing Sheets

(51) Int. Cl.

*H04W 48/16* (2009.01)
*H04W 84/12* (2009.01)

(56) References Cited

U.S. PATENT DOCUMENTS

| | | | | |
|---|---|---|---|---|
| 2018/0317128 | A1* | 11/2018 | Chun | H04L 5/0055 |
| 2018/0368018 | A1* | 12/2018 | Kim | H04L 69/04 |
| 2019/0150214 | A1* | 5/2019 | Zhou | H04W 76/15 370/329 |
| 2019/0268098 | A1* | 8/2019 | Chun | H04B 7/0413 |
| 2020/0021400 | A1 | 1/2020 | Cherian et al. | |
| 2021/0160941 | A1* | 5/2021 | Patil | H04W 74/0808 |
| 2022/0271800 | A1* | 8/2022 | Handte | H04B 7/024 |
| 2022/0303356 | A1* | 9/2022 | Cariou | H04L 5/001 |
| 2022/0416964 | A1* | 12/2022 | Fang | H04L 5/0044 |
| 2023/0090228 | A1 | 3/2023 | Sekiya et al. | |
| 2023/0254740 | A1 | 8/2023 | Sedin et al. | |
| 2023/0262803 | A1 | 8/2023 | Mger et al. | |
| 2023/0269805 | A1 | 8/2023 | Patil et al. | |
| 2025/0055501 | A1* | 2/2025 | Chitrakar | H04W 56/0015 |

OTHER PUBLICATIONS

Mark Hamilton (Ruckus / Commscope) : "libe AP MLD Architecture Discussion", IEEE Draft; 11-20-1639-14-00BE-AP-MLD-ARCHITECTURE-DISCUSSION, IEEE-SA Mentor, Piscataway, NJ USA, vol. 802.11 EHT; 802.11be, No. 14 Feb. 23, 2021, pp. 1-43, XP068178824, Retrieved from the internet: URL: https://mentor.ieee.org/802.11/dcn/20/11-20-1639-14-00be-11be-ap-mld-architecture-discussion.pptx [retrieved on Feb. 23, 2021] slides 3-43, 43 pages.

"5. MAC service definition 5.1 Overview of MAC services 5.1.5 MAC data service architecture", IEEE Draft; TGBE_CL_05, IEEE-SA, Piscataway, NJ USA, vol. 802.11be drafts Jan. 31, 2023, pp. 1-6, XP068196276, Retrieved from the internet: URL: https://grouper.ieee.org/groups/802/11/private/Draft_Standards/11be/Draft%20P802.11be_D3.0%20-%20Word.zip TGbe_Cl_05.doc [retrieved on Jan. 31, 2023] section 5.1.5 with subsections, 6 pages.

Brian Hart (Cisco Systems): "Roaming Requirements", IEEE Draft; 11-23-0324-01 Ouhr-Roaming-Requirements, IEEE-SA Mentor, Piscataway, NJ USA, vol. 802.11 UHR, No. 1—May 15, 2023, XP068203219, Retrieved from the internet: URL: https://mentor.ieee.org/802.11/dcn/23/11-23-0324-01-0uhr-roaming-requirements.pptx [retrieved on May 15, 2023] slides 2-25, 15 pages.

* cited by examiner

JOINT TRANSMISSION FOR ENHANCED DIVERSITY AND RELIABILITY

CROSS-REFERENCE TO RELATED APPLICATION

This application claims benefit of and priority to U.S. Provisional Patent Application No. 63/487,778, filed Mar. 1, 2023, entitled "ASPECTS OF DISTRIBUTED MLO AND JOINT TRANSMISSION", the entire contents of which is incorporated herein by reference in its entirety.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards and amendments is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
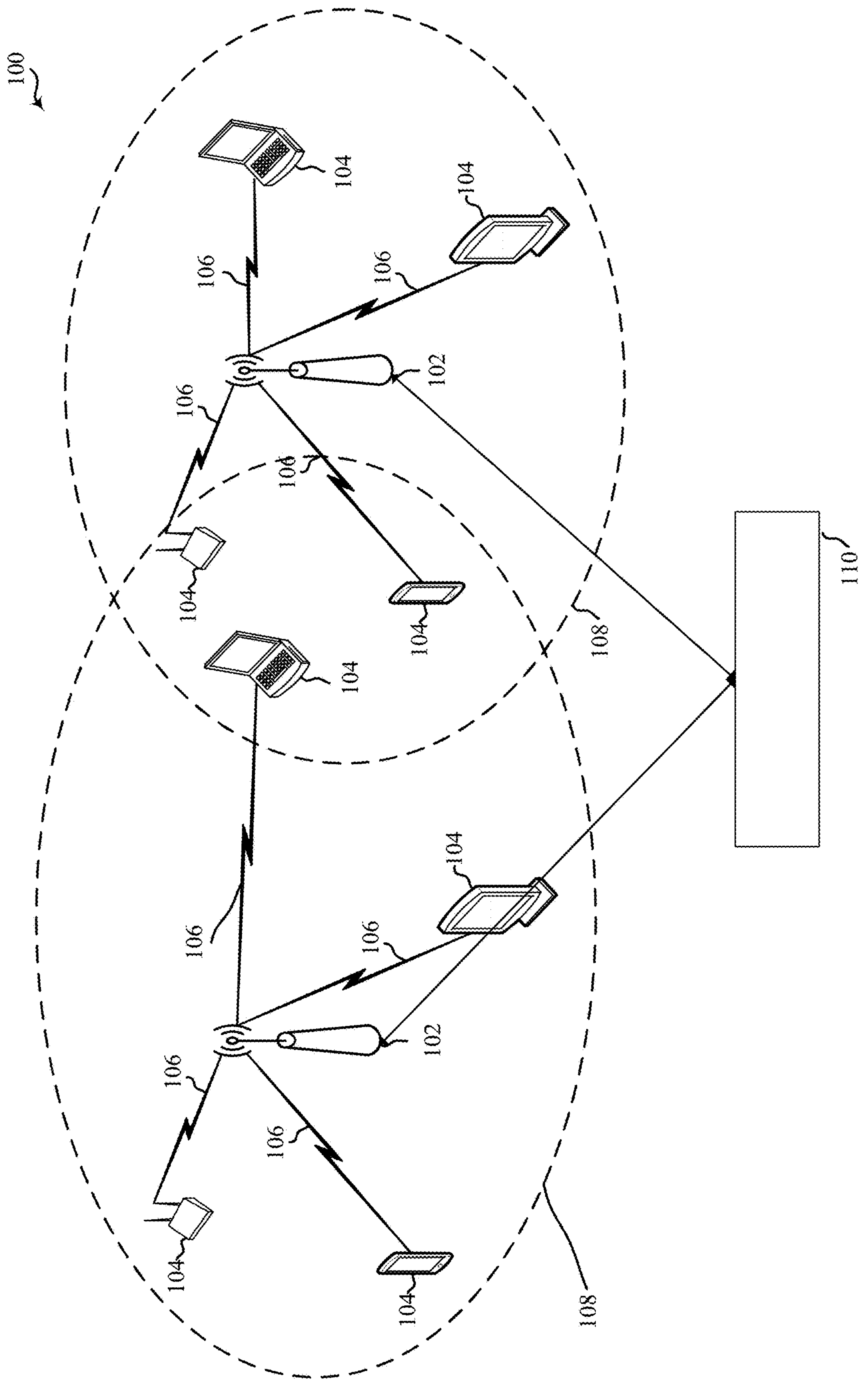
FIG. 1 shows a pictorial diagram of an example wireless communication network according to some aspects of the present technology.

The following description is directed to some particular examples for the purposes of describing innovative aspects of this disclosure. However, a person having ordinary skill in the art will readily recognize that the teachings herein may be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards and amendments.

According to at least one example, a method includes: establishing an upper upper medium access controller (upper UMAC); establishing a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmitting one or more proto-medium access controller protocol data units (proto-MPDUs) from the upper UMAC to the plurality of AP actors; attaching PHY and MAC metadata to the one or more proto-MPDUs; and forming, at each of the plurality of AP actors, a PHY protocol data unit (PPDU), wherein each PPDU is formed from a corresponding one of the one or more proto-MPDUs.

A system that includes a memory configured to store data, such as virtual content data, one or more images, etc. and one or more processors (e.g., implemented in circuitry) communicatively coupled to the memory and configured to execute instructions of the above described method. The present disclosure also includes a system having a storage (implemented in circuitry) configured to store instructions and a processor. The processor configured to execute the instructions and cause the processor to: establish an upper upper medium access controller (upper UMAC); establish a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmit one or more proto-medium access controller protocol data units (proto-MPDUs) from the upper UMAC to the plurality of AP actors; attaching PHY and MAC metadata to the one or more proto-MPDUs; and form, at each of the plurality of AP actors, a PHY protocol data unit (PPDU), wherein each PPDU is formed from a corresponding one of the one or more proto-MPDUs.

Additionally, a computer readable medium includes instructions using a computer system. The computer system includes a memory (e.g., implemented in circuitry) and a processor (or multiple processors) communicatively coupled to the memory. The processor (or processors) is configured to execute the computer readable medium and cause the processor to: establish an upper upper medium access controller (upper UMAC); establish a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmit one or more proto-medium access controller protocol data units (proto-MPDUs) from the upper UMAC to the plurality of AP actors; attaching PHY and MAC metadata to the one or more proto-MPDUs; and form, at each of the plurality of AP actors, a PHY protocol data unit (PPDU), wherein each PPDU is formed from a corresponding one of the one or more proto-MPDUs.

FIG. 1 illustrates a block diagram of an example wireless communication network 100. According to some aspects, the wireless communication network 100 may be an example of a wireless local area network (WLAN) such as a Wi-Fi network (and will hereinafter be referred to as WLAN 100). For example, the WLAN 100 may be a network implementing at least one of the IEEE 802.11 family of wireless communication protocol standards and amendments thereof (such as that defined by the IEEE 802.11-2016 specification or amendments thereof including, but not limited to, 802.11ay, 802.11ax, 802.11az, 802.11ba and 802.11be). Additionally, the WLAN 100 may implement future versions and amendments of the wireless communication protocol standards and amendments thereof such as 802.11bn and be modified according to the present disclosure to include the features contained herein. The WLAN 100 may include numerous wireless communication devices such as an AP actor, which can be one or more of a non-MLD AP, an AP affiliated with an AP MLD, and/or an AP MLD. In the examples presented herein, the AP actor can exclude an upper UMAC. Therefore, the AP actor can include the lower UMAC, LMAC, and/or PHY. Additionally, the WLAN can include one or more STA actors 104, which can be one or more of a non-MLD STA, a STA affiliated with a non-AP MLD, and/or a non-AP MLD. As illustrated, the WLAN 100 also may include multiple AP actors 102. The multiple AP actors 102 can be coupled to one another through a switch 110. While the multiple AP actors 102 are shown as being coupled to one another through a switch 110, the network can provide another device that allows the coupling of the multiple AP actors.

Each of the STA actors 104 also may be referred to as a mobile station (MS), a mobile device, a mobile handset, a wireless handset, an access terminal (AT), a user equipment (UE), a subscriber station (SS), client, or a subscriber unit, among other examples. The STA actors 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples. In other examples, the STA actors 104 can be referred to as clients and/or client devices.

A single AP actor 102 and an associated set of STA actors 104 may be referred to as a basic service set (BSS), which is managed by the respective AP 102. FIG. 1 additionally shows an example coverage areas 108 of the associated AP 102, which may represent a basic service area (BSA) of the WLAN 100. As illustrated, three of the STA actors 104 are within the BSA of each of the AP actors 102. The BSS may be identified to users by a service set identifier (SSID), where the BSS might be one of many in the SSID. The BSS may be identified to other devices by a unique (or substantially unique) basic service set identifier (BSSID). The AP 102 periodically broadcasts beacon frames ("beacons") including the BSSID to enable STA actors 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons may include an identification of a primary channel used by the respective AP 102 as well as a timing synchronization function for establishing or maintaining timing synchronization with the AP 102. The AP 102 may provide communication links 106 to the various STA actors 104 and therefore access to external networks. While the example has been described in regards to an AP 102 and STA actors 104, the present disclosure extends such that an AP actor may provide access to external networks to various STA actors in a WLAN via respective communication links 106.

To establish a communication link 106 with an AP 102, each of the STA actors 104 is configured to perform passive or active scanning operations ("scans") on frequency channels in one or more frequency bands (for example, the 2.4 GHz, 5 GHz, 6 GHz or 60 GHz bands). To perform passive scanning, a STA actor 104 listens for beacons, which are transmitted by respective AP 102 at or near a periodic time referred to as the target beacon transmission time (TBTT) (measured in time units (TUs) where one TU may be equal to 1024 microseconds (μs)). To perform active scanning, a STA actor 104 generates and sequentially transmits probe requests on each channel to be scanned and listens for probe responses from AP 102. Each STA actor 104 may be configured to identify or select an AP and thence an AP 102 with which to associate based on the scanning information obtained through the passive or active scans, and to perform authentication and association operations to establish a communication link 106 with the selected AP 102. The AP 102 assigns an association identifier (AID) to the STA actor 104 at the culmination of the association operations, which the AP 102 uses to improve the efficiency of certain signalling to the STA actor 104.

The present disclosure modified the WLAN radio and baseband protocols for the PHY and medium access controller (MAC) layers. The AP 102 and STA actors 104 transmit and receive wireless communications (hereinafter also referred to as "Wi-Fi communications") to and from one another in the form of PHY protocol data units (PPDUs). The AP 102 and STA actors 104 also may be configured to communicate over other frequency bands such as shared licensed frequency bands, where multiple operators may have a license to operate in the same or overlapping frequency band or bands.

Each PPDU is a composite structure that includes a PHY preamble and a payload in the form of one or more PHY service data unit (PSDU). The information provided in the preamble may be used by a receiving device to decode the subsequent data in an intended PSDU. In instances in which PPDUs are transmitted over a bonded channel, selected preamble fields may be duplicated and transmitted in each of the multiple component channels.

Figure 2A:
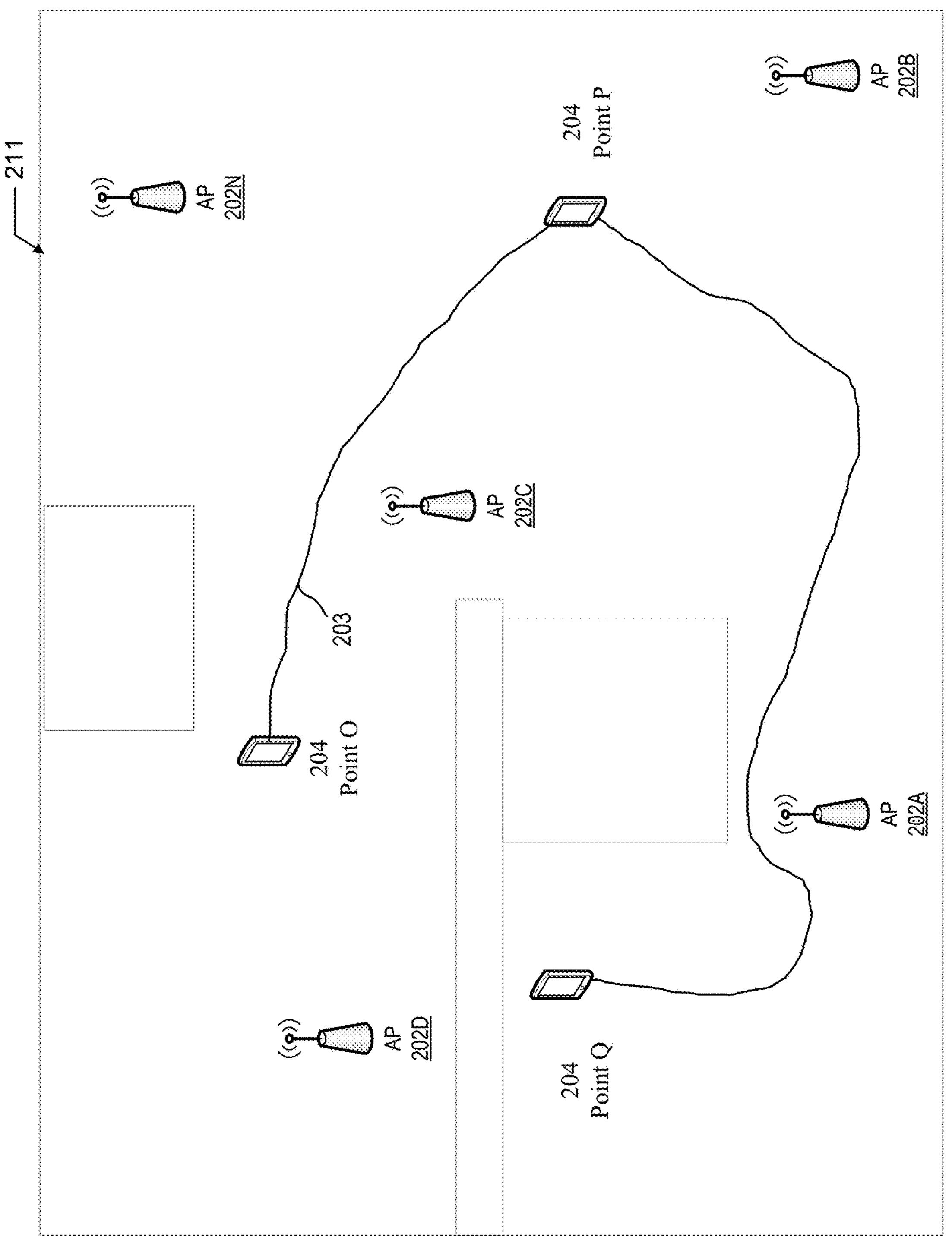
FIG. 2A illustrates an example of a wireless communication network spanning a single floor of a building.

FIG. 2A illustrates an example a single floor 211 of building. While only a single floor is illustrated a description equally applies to multiple floors in a building. Additionally, some of the floors in a building may not be contiguous, such that floors 1, 3, 4, and 8 span a network for a building that has floors 1-10. Thus, in at least one implementation the building can include one or more floors that do not have a network including one or more AP actors. As illustrated, the single floor 211 includes a plurality of AP actors 202A, 202B, 202C, 202D, 202N. Each of the AP actors 202A, 202B, 202C, 202D, 202N can have a respective coverage area such that an overall coverage area can span substantially the entire floor. In other examples, the overall coverage area can extend beyond the entire floor. In other examples, the overall coverage area can extend beyond the entire floor. Additionally, the coverage of one AP actor 202A, 202B, 202C, 202D, 202N may substantially overlap with the coverage of another of the AP actors 202A, 202B, 202C, 202D, 202N.

As illustrated by the line 203, STA actor 204 can move from point O to point P to point Q. When a STA actor 204 is moving around on a given floor, different AP actors 202A, 202B, 202C, 202D, 202N can be considered to be nearest to the STA actor 204. Nearest as used in relation to the AP actors 202A, 202B, 202C, 202D, 202N and STA actor 204 can include being physically nearest (for example, a Euclidean distance on the floor) and/or pathloss-nearest (for example, having the lowest wireless attenuation (pathloss) between AP actor, among all the AP actors, and STA actor). Additionally, the pathloss-nearest approach can be used to reduce the likelihood of connection between an AP actor on a floor above or below the STA actor 204. The location of the AP actor on the floor above or below might be closer in a Euclidean sense, but also not be a desirable AP for the connection of the device or station due to the floor location and/or possible signal interruption. The location of the AP actor on the floor above or below might be closer in a straight line and/or Euclidean sense, but also not be a desirable AP for the connection of the device or station due to the floor location and/or possible signal interruption. Additionally, the coverage of one or more AP actors can at least partially overlap with the coverage of one or more other AP actors. The present disclosure provides for selecting the AP actor and/or providing a communication pathway from one or more STA actors through one or more AP actors.

Figure 2B:
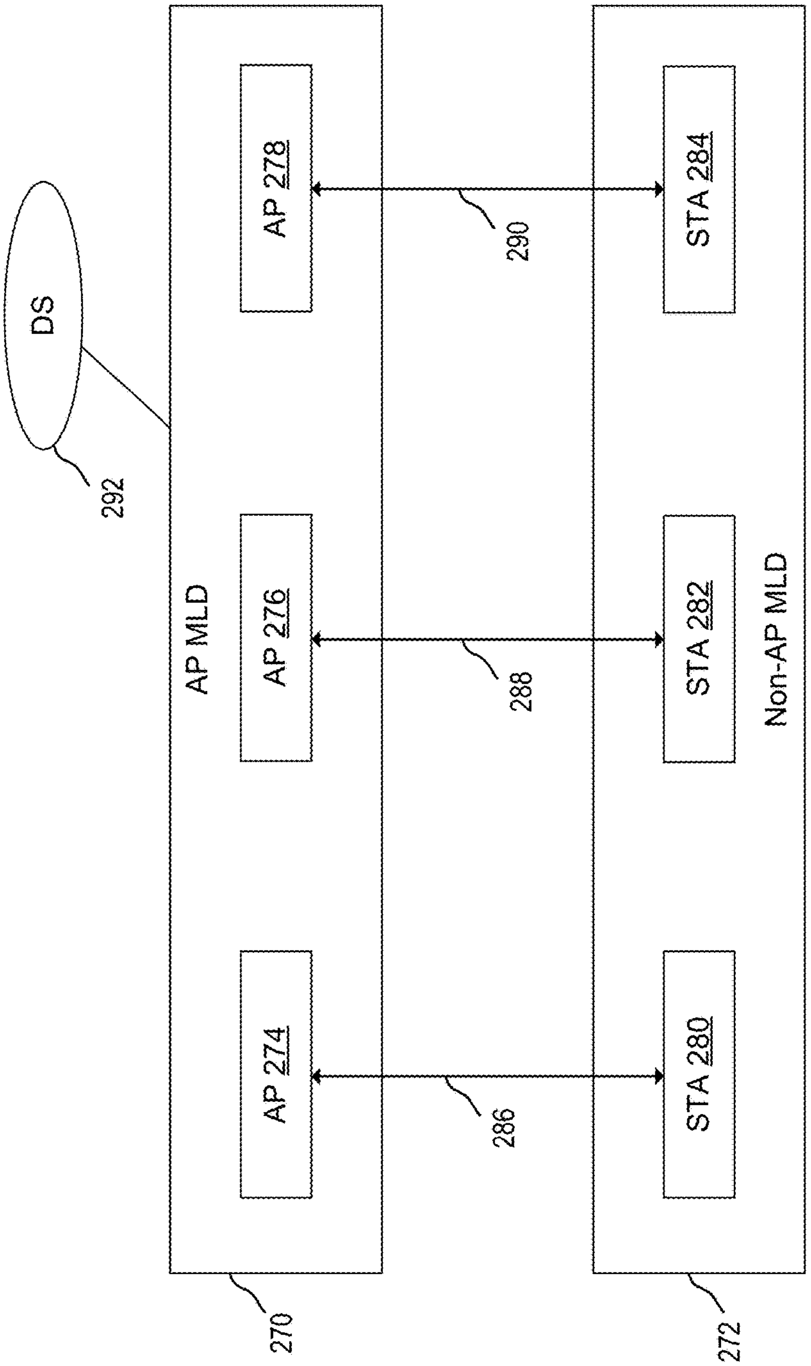
FIG. 2B depicts an illustrative schematic diagram for connectivity of an AP multi-link device (MLD) with multiple affiliated APs to a non-AP MLD with multiple affiliated non-AP STAs according to some aspects of the present disclosure.

FIG. 2B depicts an illustrative schematic diagram for MLO between an AP MLD with affiliated logical entities and a non-AP MLD with affiliated logical entities according to some aspects of the present disclosure.

Referring to FIG. 2B, two multi-link logical entities AP MLD 270 and Non-AP MLD 272 are shown. AP MLD 270 may include physical and/or logical affiliated APs 274, 276, and 278 operating in different channels and typically different frequency bands (e.g., 2.4 GHz, 5 GHz, and 6 GHz). Affiliated APs 274, 276, and 278 may be the same as or similar to any one of the APs described above. Non-AP MLD 272 may include STAs 280, 282, and 284, which may be the same as or similar to any of the STAs as described herein.

Affiliated AP 274 may communicate with affiliated STA 280 via link 286. Affiliated AP 276 may communicate with affiliated STA 282 via link 288. Affiliated AP 278 may communicate with affiliated STA 284 via link 290.

AP MLD 270 is shown in FIG. 2B to have access to a distribution system (DS) 292, which is a system used to interconnect a set of BSSs to create an extended service set (ESS).

It should be understood that although the example shows three logical entities within the AP MLD and the three logical entities within the non-AP MLD, this is merely for illustration purposes and that other numbers of logical entities within each of the AP MLD and non-AP MLD may be envisioned. The example Wi-Fi systems and MLO described above with reference to FIGS. 1 and 2A-B provide examples of simplified and example systems of the present disclosure. Additional details of the present disclosure are provided in relation to FIGS. 3A-D, 4, and 5.

Figure 3A:
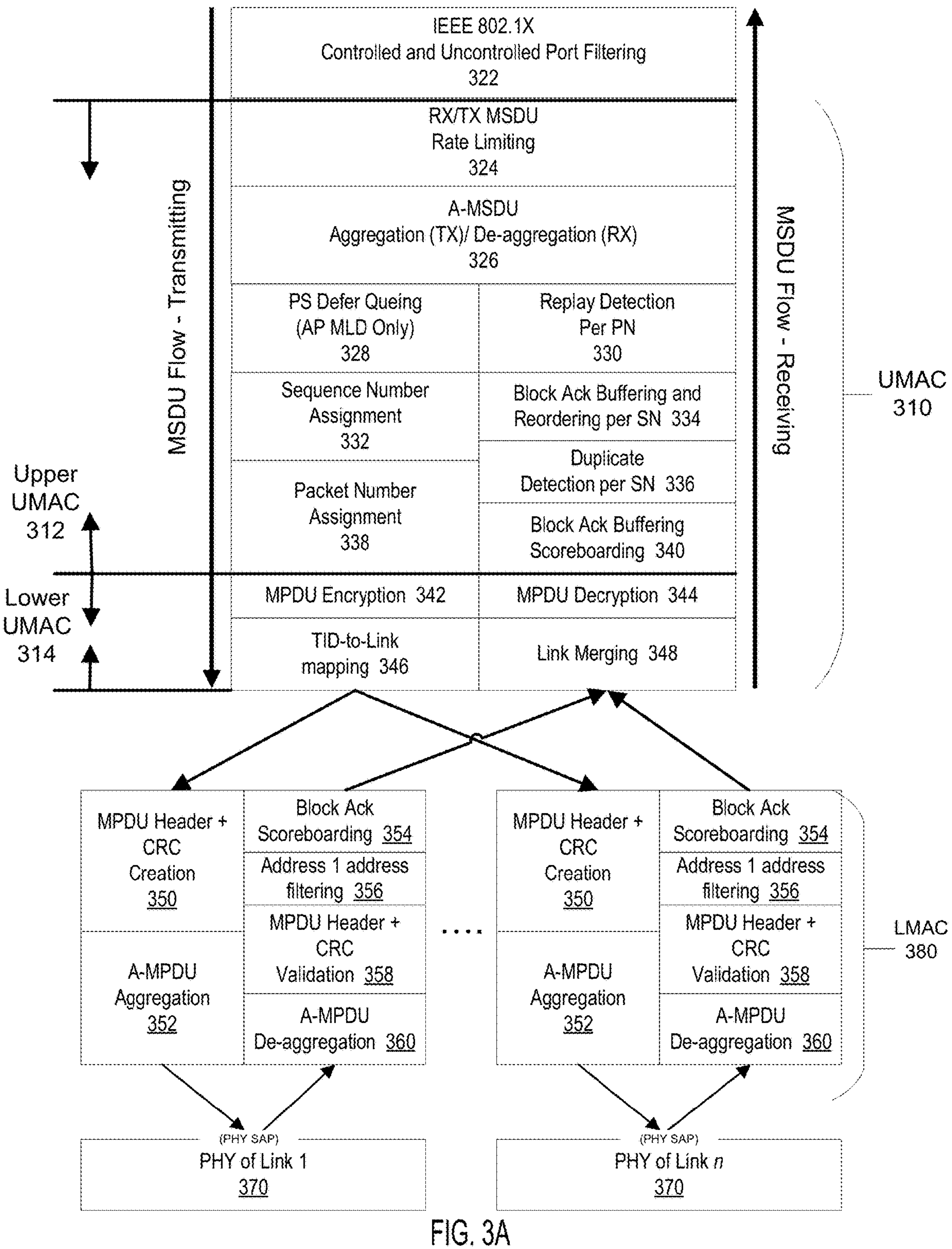
FIG. 3A illustrates an example block diagram of upper medium access control (UMAC) being split into an upper UMAC and one or more lower UMACs, lower MACs (LMACs) and physical layers (PHYs)

FIG. 3A illustrates existing structure for UMAC 310, LMAC 380, the proposed splitting of the UMAC 310 into an upper UMAC 312 and one or more lower UMACs 314, and connectivity to the PHY. The UMAC 310 includes a MAC Service Data Unit (MSDU) flow for transmitting and a MSDU flow for receiving. The receiving flow is in the opposite direction of the transmitting. As illustrated, a UMAC 310 includes controlled and uncontrolled port filtering 322. The port filtering 322 may be in accordance with one of the IEEE 802.1X types of standards and amendments as described herein and those that might be agreed upon in the future. As illustrated, the UMAC 310 includes block for receiving/transmitting MSDU rate limited 324. Furthermore, the UMAC 310 includes an aggregate-MSDU (A-MSDU) function, which applies aggregation for transmitting and a receiving de-aggregation 326. Additionally, in at least one example with AP MLD as described above, a PS defer queuing 328 is included. In at least one example, a replay detection per PN 330 is optionally included. A sequence number assignment 332 may be included as well. A packet number assignment 338 may be included. Additionally, block acknowledgement (Block Ack or BA) buffering and reordering 334 may be performed per sequence number. Furthermore, the UMAC may include a duplicate detection per sequence number 336. Still further, the UMAC may include a Block Ack buffering scoreboarding 340 feature. Additionally, the UMAC may include MAC Protocol Data Unit (MPDU) encryption 342 and MPDU decryption 344. Still further, a traffic identifier (TID)-to-Link mapping function 346. Additionally, the UMAC 310 may include link merging 348.

As presented herein the UMAC 310 may be split into an upper UMAC 312 and one or more lower UMACs 314. The upper UMAC 312 can be located on a single AP or other network device and the one or more lower UMACs 314 can be collocated or otherwise within a corresponding LMAC 380. The lower UMAC 314 can contain substantially any function not associated with the upper UMAC 312. The upper UMAC 314 must contains the AMSDU aggregation and deaggregation functions 326, the sequence number (SN) assignment 332, packet number (PN) assignment 338, replay detection per PN 330, and BA buffering and reordering per SN 336. The upper UMAC can optionally include the RX/TX MSDU rate limiting 324 function, the PS defer queuing 328, the duplicate detection per SN 336, BA scoreboarding 340. The one or more lower UMACs 314 may each include any of the remaining functions of the UMAC 310. Thus, the one or more lower UMACs can include functions for include a MPDU decryption 344 and a MPDU encryption 342. Additionally, the one or more lower UMACs may each include a TID-to-Link mapping function 346 and a link merging 348, each of which may communicate with a respective LMAC 380 and thence PHY 370.

As illustrated, the one or more lower UMACs 314 communicates with a plurality of LMACs 380, which in turn communicate with corresponding PHYs 370. Each of the LMACs 380 may include a MPDU Header and cyclic redundant check (CRC) creation function 350. Furthermore, the LMACs 380 include an aggregate MPDU (A-MPDU) aggregation function 352. The path through which the data traverses on the way to the PHY 370 includes arriving from the TID-to-Link mapping function 346 of the one or more lower UMACs 314 and being received by the MPDU header and CRC creation function 350 and the A-MPDU aggregation function 352. Data that is received may likewise by received by the PHY 370 and then proceed through the LMAC 380. The received data from the PHY 370 of one of a number n links pass through the LMAC 380 by going through an A-MPDU aggregation function 360 and then a MPDU header and CRC validation function 358. The data proceeds to go through address 1 address filtering 356 before being passed through the Block Ack scoreboarding 354, which moves the data to the link merging 348 of the one or more lower UMACs 314.

Additionally, in at least one example, as the STA actor enters or is about to enter a roam point (RP), the upper UMAC remains in operation at an initial AP actor or a network element such as a wireless LAN controller, while the one or more lower UMACs can be added to provide the desired coverage. The one or more lower UMACs can be associated with different AP actors. Data can flow from the one or more lower UMACs of the more proximal AP actor(s) to the upper UMAC of the initial AP. Likewise data can flow from the upper UMAC of the initial AP actor to the one or more lower UMACs of the subsequent AP actor(s). The communication can be to all connected lower UMACs of each of the AP actors at substantially the same time, thereby multiple substantially simultaneous connectivity is provided. After a period of time, the initial one or more of the lower UMACs can stop communicating with the STA actor provided that a plurality of lower UMACs if continued communication is desired. Furthermore, after a period of time, the additional one or more lower UMACs, not heretofore described, can start communicating with the STA actor. Additionally, after a period of time, the initial upper UMAC in the initial device can be transitioned to an upper UMAC in a more proximal or less loaded subsequent device as well. In one or more examples, the upper UMAC can be located on a separate AP actor from the one or more lower UMACs. Additionally, the upper UMAC can be located on a separate network device that is not an AP actor. In at least one example, the upper UMAC can reside in a non-wireless device separate from each of the one or more lower UMACs.

In at least one example, the LMAC 380 and lower UMAC 314 can be collocated. In other examples, the functions of the LMAC 380 and lower UMAC 314 can be combined. Thus, there can be multiple lower UMACs 314. Additionally, as mentioned above, the lower UMAC 314 can have some of the functions that were described in regards to the UMAC 310 and upper UMAC 312 as well. Specifically those functions can include one or more of RX/TX SMDU rate limiting 324, PS defer queuing 328, duplicate detection per SN 336, BA buffering scoreboarding 340.

Figure 3B:
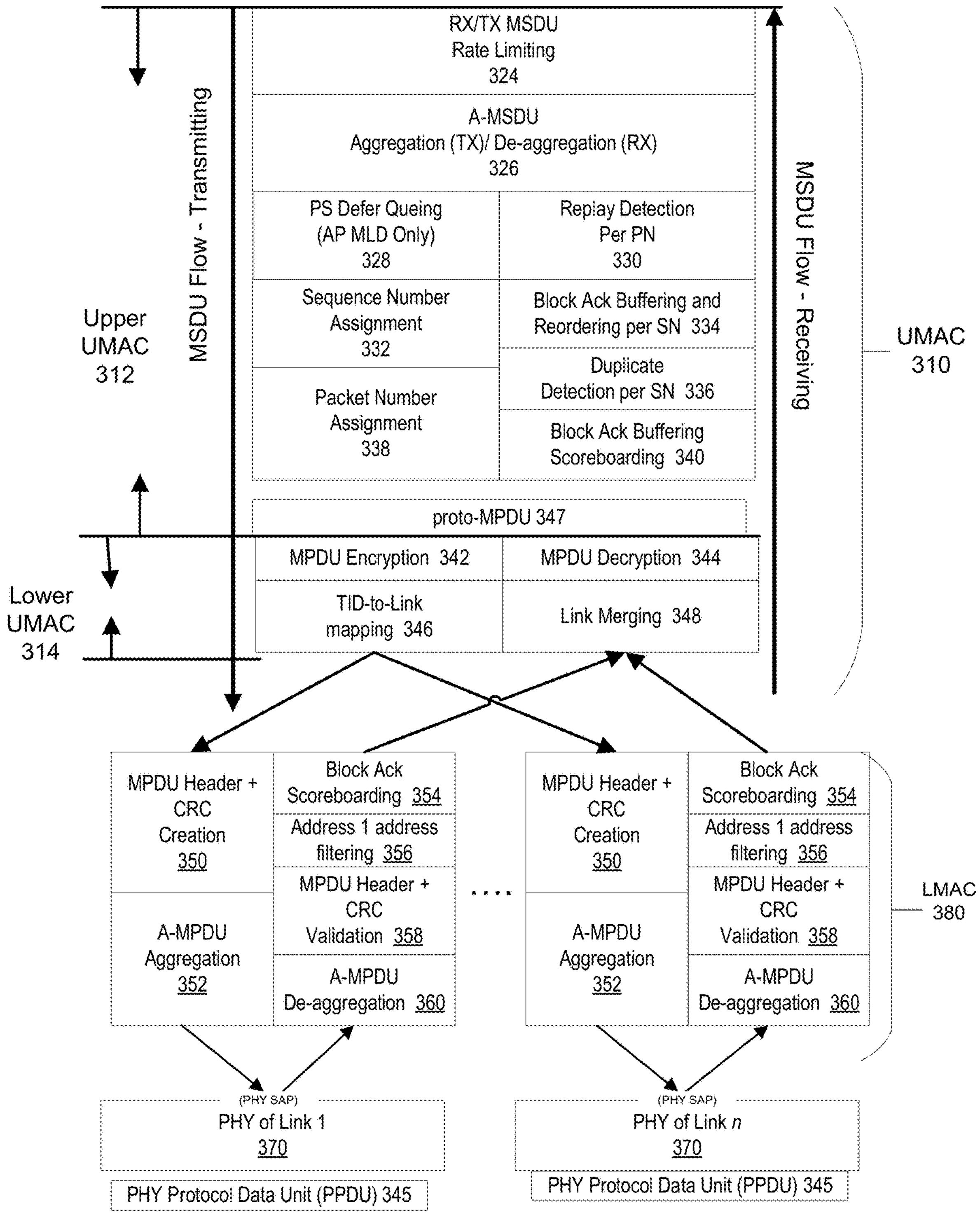
FIG. 3B illustrates an example block diagram of forming a physical layer (PHY) protocol data unit (PPDU)

FIG. 3B illustrates an example block diagram of forming a physical layer (PHY) protocol data unit (PPDU). As illustrated, the present technology forms a PPDU 345 in the lower UMAC 314. The PPDU 345 can be constructed according to PHY metadata to allow communication between the STA actor and the switch as further illustrated in FIGS. 3C and 3D. Additionally, the present technology also forms a proto-MPDU 347 to be contained in the PPDU. PHY and MAC metadata can be attached to a single one of the corresponding proto-MPDUs. Furthermore, each PHY can transmit a beamformed PPDU at the same time. Furthermore proto-MPDUs can be sent from the upper UMAC to one or more of the plurality of lower UMACs. The upper UMAC can send additional MAC metadata and PHY metadata in a header for the proto-MPDU. Additionally, the present technology can form an aggregated MAC protocol data unit (AMPDU) according to MAC metadata. The AMPDU can include one or more MPDUs. Additionally, in forming the PPDU, the present technology can form the AMPDUs at the same time. Furthermore, in at least one example, each lower UMAC can form MPDUs and AMPDUs according to the MAC metadata associated with an assigned identifier and overriding MAC metadata in a trigger frame.

Figure 3C:
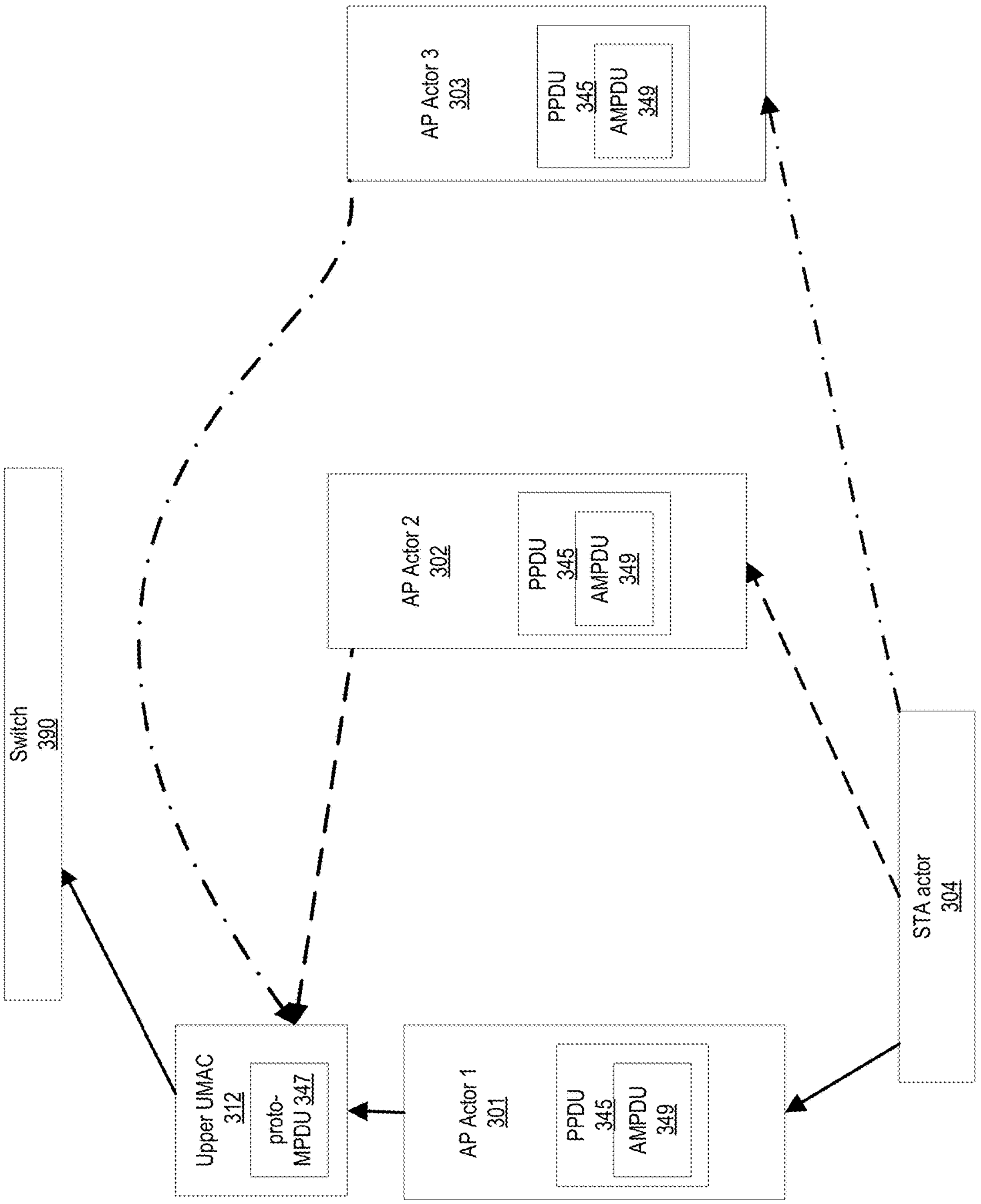
FIG. 3C illustrates an example block diagram of a plurality of AP MLDs connecting a single STA actor to a switch.

FIG. 3C illustrates an example block diagram of a plurality of AP actors 301, 302, 303 connecting a single STA actor 304 to a switch 390. Additionally, an upper UMAC 312 is located separate and apart from the plurality of AP actors 301, 302, 303. The upper UMAC 312 can be configured to be separate and apart from the AP actors 301, 302, 303 in the manufacturing process such that the upper UMAC 312 is located on a separate piece of hardware as compared to the AP actors 301, 302, 303. The AP actors 301, 302, 303 can include a lower UMAC, LMAC, and/or PHY. Additionally, the functions as described herein can be included on the AP actors 301, 302, 303. Each of the AP actors 301, 302, 303 can form a PPDU 345 that can optionally include an AMPDU 349. The STA actor 304 can be in a neighborhood that includes AP actor 301, AP actor 302, and AP actor 303. While three AP actors 301, 302, 303 are illustrated in the present example the number of AP actors can be different for example greater than three within a neighborhood. The neighborhood can be defined as those AP actors 301, 302, 303 that are near enough to the STA actor 304 to allow communication therewith. In another example, the neighborhood can be defined as those AP MLDs that are near enough to the STA actor to allow communication and are optionally also located within the same building and/or same floor. The STA actor 304 can connect wireless through the AP actors 301, 302, 303 to a switch 390 to allow access to an internet, an intranet, or other network.

As illustrated, the STA actor 304 can be wirelessly communicatively coupled to the first AP actor 301 as shown by the solid line. The first AP actor 301 can be communicatively coupled to switch 390 through the upper UMAC 312. The communicatively coupling between the switch 390 and the first AP actor can be wired or wireless.

As illustrated, the STA actor 304 can be wirelessly communicatively coupled to the second AP actor 302 as shown by the dashed line. The second AP actor 302 can be communicatively coupled to switch 390 through the upper UMAC 312. As illustrated, the STA actor 304 can be wirelessly communicatively coupled to a third AP actor 303 as shown by the dashed dot line. The third AP actor 303 can be communicatively coupled to switch 390 through the upper UMAC 312. The configuration of multiple AP actors 301, 302, 303 being coupled to a single STA actor 304 provides for efficient roaming so that the STA actor 304 can move out of range of the first AP actor 301, while still maintaining connectivity through the upper UMAC 312. The ability to maintain connectivity allows for STA actor 304 to not lose data packets that are being sent to the switch 390.

As illustrated, the STA actor 304 can send data to the AP actor such that an AMPDU 349 is formed on the plurality of AP actors 301, 302, 303. The AP actors 301, 302, 302 can form and/or receive PPDU 345. The AP actors 301, 302, 303 can transmit the PPDU 345 to the upper UMAC 312, which forms proto-MPDU 347. Likewise, the reverse flow allows for data from the switch 390 to reach the STA actor 304 without interruption. In the reverse flow, additional data can be included beyond the proto-MPDU 347 being transmitted to the AP actors 301, 302, 303.

Figure 3D:
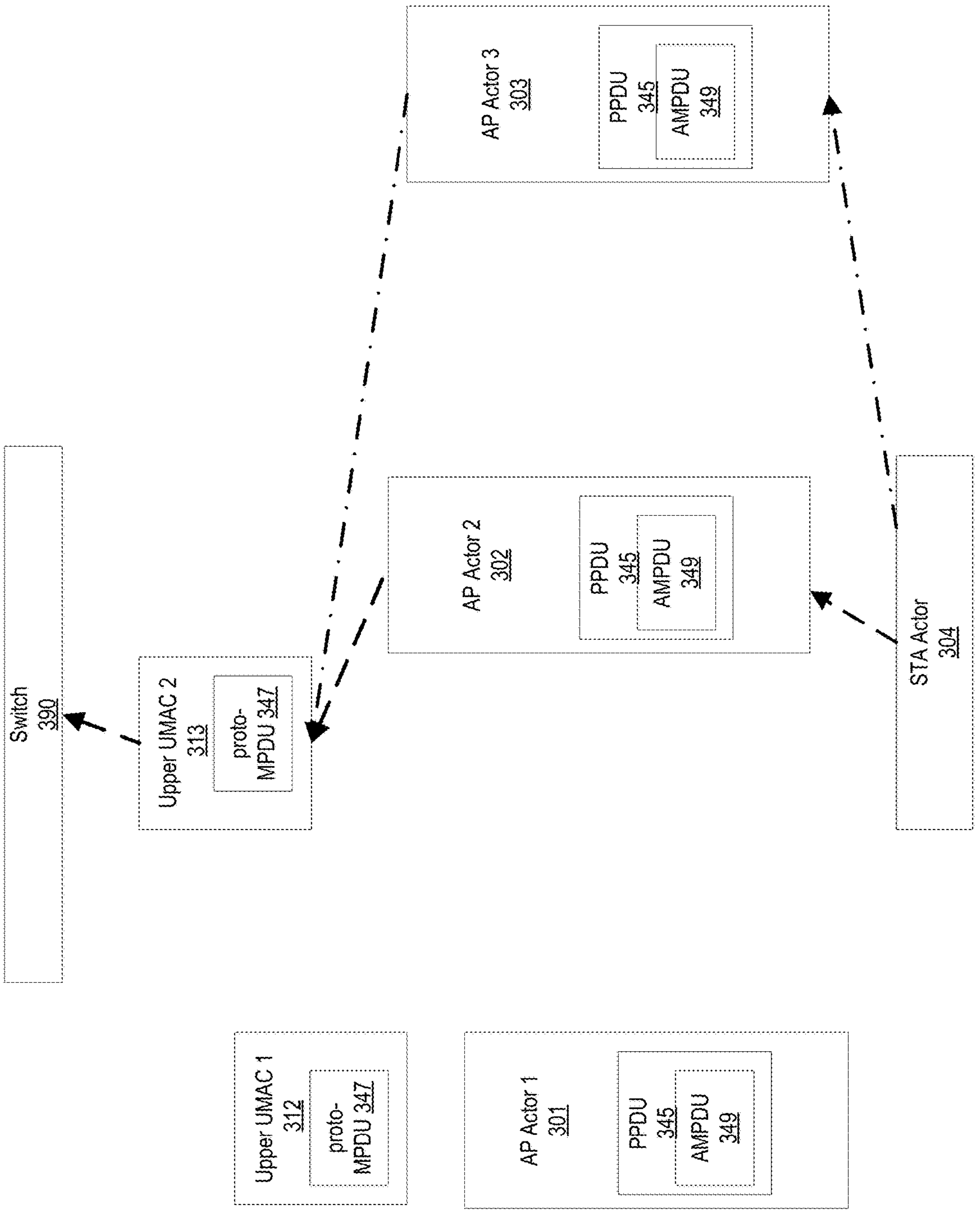
FIG. 3D illustrates another example block diagram of a plurality of AP MLDs connecting a single STA actor to a switch.

FIG. 3D illustrates another example block diagram of a plurality of AP actors 302, 303 connecting a single STA actor 304 to a switch 390. As illustrated, the connection between STA actor 304 and the first AP actor 301 has stopped. The connection can stop after the data flow is able to establish a direct connection between the nearest the second AP actor 302. As illustrated, the STA actor 304 is nearer to second AP actor 302 as compared to first AP actor 301 and the third AP actor 303. As the STA actor 304 moves in the direction from first AP actor 301 to second AP actor 302 and continues in the direction of third AP actor 303. Additionally, the present disclosure includes changing the upper UMAC for the connection to the switch 390. For example, the first upper UMAC 312 could have been closer to the first AP actor 301. The transition to the second UMAC 313 as illustrated can be achieved. In other examples, the connection remains fixed through the first upper UMAC 312. The STA actor 304 can be communicatively coupled through second AP actor 302 and third AP actor 303 to the switch through an upper UMAC (either the first upper UMAC 312 or the second upper UMAC 313, as illustrated). The flow of data can be such as described in FIG. 3C except that no data flows through the first AP actor 301.

Figure 4:
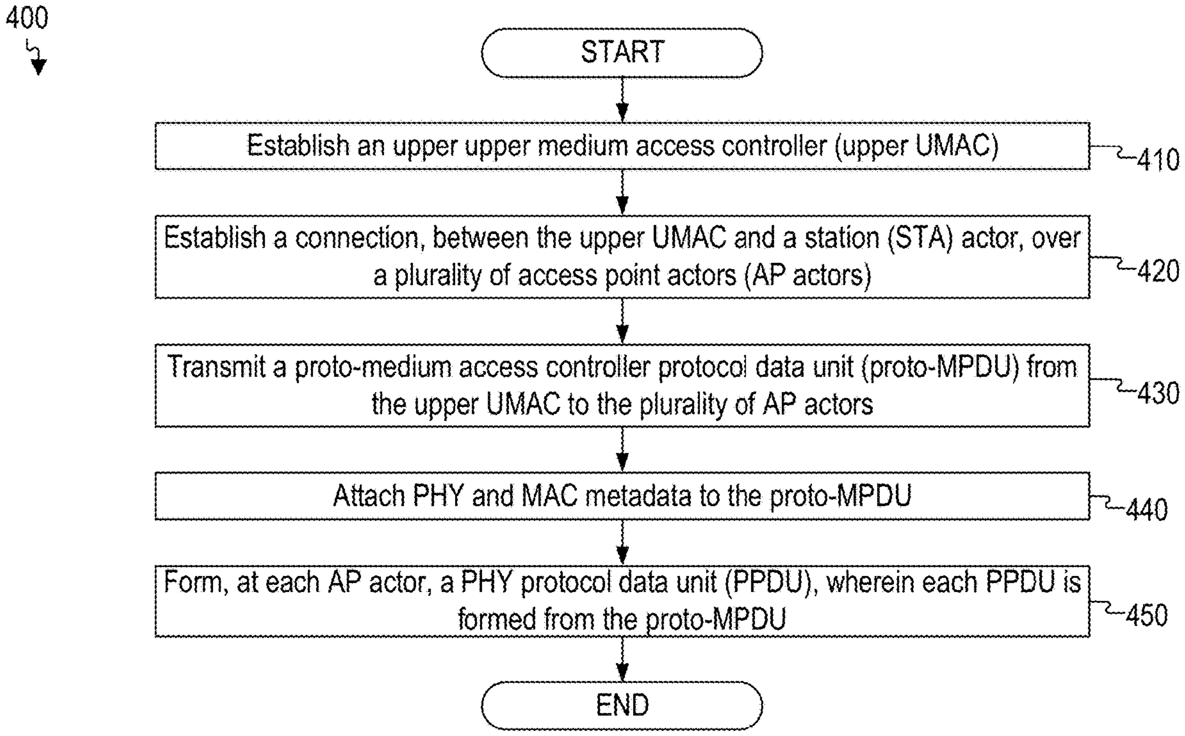
FIG. 4 illustrates an example routine for joint transmission for a wireless connection according to some aspects of the present technology.

FIG. 4 illustrates an example method 400 for providing joint transmission for a wireless connection. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes establishing an upper UMAC at block 410. The present disclosure also includes having this performed during the manufacturing process so that this portion of the method is optional. For example, as illustrated in FIG. 3A each of the UMACs may be split into an upper UMAC and one or more AP actors that include a lower UMAC, LMAC, and PHY. In other examples, these can be dynamically separated such that existing hardware is implemented and a UMAC is split into the upper and lower UMACs as described herein. Thus, the upper UMAC can be on a separate device from the AP actor.

According to some examples, the method includes establish a connection, between an upper upper medium access controller (upper UMAC) and a station (STA) actor, over a plurality of access point actors (AP actors) at block 420. In at least one example, each of the AP actors includes a lower upper medium access controller (UMAC), a lower medium access controller (LMAC), and a physical layer (PHY). For example, the STA actor 304 illustrated in FIG. 3C may select the plurality of AP actors 301, 302, 302 nearby the STA actor 304. As described herein, the STA actor is within the coverage range of each of the plurality of AP actors. If the STA actor and/or network infrastructure determines that a connectivity to an additional one or more AP actors can be determined based on movement, the present disclosure can be described such that the STA actor that is nearby a plurality of AP actors can also be described as being within a neighborhood of AP actors. A neighborhood of AP actors can refer to AP actors that are within the same building. Additionally, a neighborhood of AP actors can refer to AP actors that are on the same floor of the same building. Furthermore, a neighborhood of AP actors can refer to AP actors that are identified by a controller or switch as being within a predetermined grouping of AP actors that are within radio transmission distance of another one of the AP actors.

According to some examples, the method includes transmitting one or more proto-medium access controller protocol data units (proto-MPDUs) from the upper UMAC to the plurality of AP actors at block 430.

According to some examples, the method includes attaching PHY and MAC metadata to the one or more proto-MPDUs at block 440. The method can also include sending additional MAC metadata and PHY metadata in a header for the proto-MPDU.

According to some examples, the method includes forming, at each of the plurality of AP actors, a PHY protocol data unit (PPDU), wherein each PPDU is formed from a corresponding one of the one or more proto-MPDUs at block 450. Additionally, each PPDU can be constructed according to PHY metadata. According to some examples, the method includes attaching PHY and MAC metadata to a single one of the corresponding proto-MPDUs. For example, in FIG. 3B PHY and MAC metadata may be attached to a single one of the corresponding proto-MPDUs 347. In other examples, the PHY and MAC metadata can be attached to more than one pro-MPDUs 347.

Additionally, each PHY collocated with a corresponding one of the LMACs can apply a steering matrices based upon one or more of the additional MAC metadata and/or PHY metadata. The plurality of nearby access points can perform a sounding to obtain steering matrices. Each PHY can transmit a beamformed PPDU at a same time. The additional MAC metadata and/or PHY metadata includes an assigned identifier that is unique across STA actors and a plurality of nearby AP actors within a predetermined timestamp and/or predetermined neighborhood. In another example, the additional MAC metadata and/or PHY metadata includes a unique transmission across STA actors and a plurality of nearby AP actors. In at least one example, the plurality of nearby AP actors initially synchronize to a trigger frame.

Additionally, the method can include forming an aggregated MAC protocol data unit (AMPDU) according to MAC metadata, wherein the AMPDU can include one or more MPDUs. For example, FIG. 3C illustrates AMPDU 349 within a PPDU 345. In at least one example, the PPDU is formed from the AMPDU. Additionally, each lower UMAC forms MPDUs and AMPDUs according to the MAC metadata associated with the assigned identifier and overriding MAC metadata in the trigger frame.

According to some examples, the method can include sending proto-MPDUs from the upper UMAC to one or more of the plurality of lower UMACs. The sending of proto-MPDUs from a single upper UMAC to one or more of the plurality of lower UMACs allows for the data to be maintained regardless of losing connection between a STA actor and one or more lower UMACs.

Figure 5:
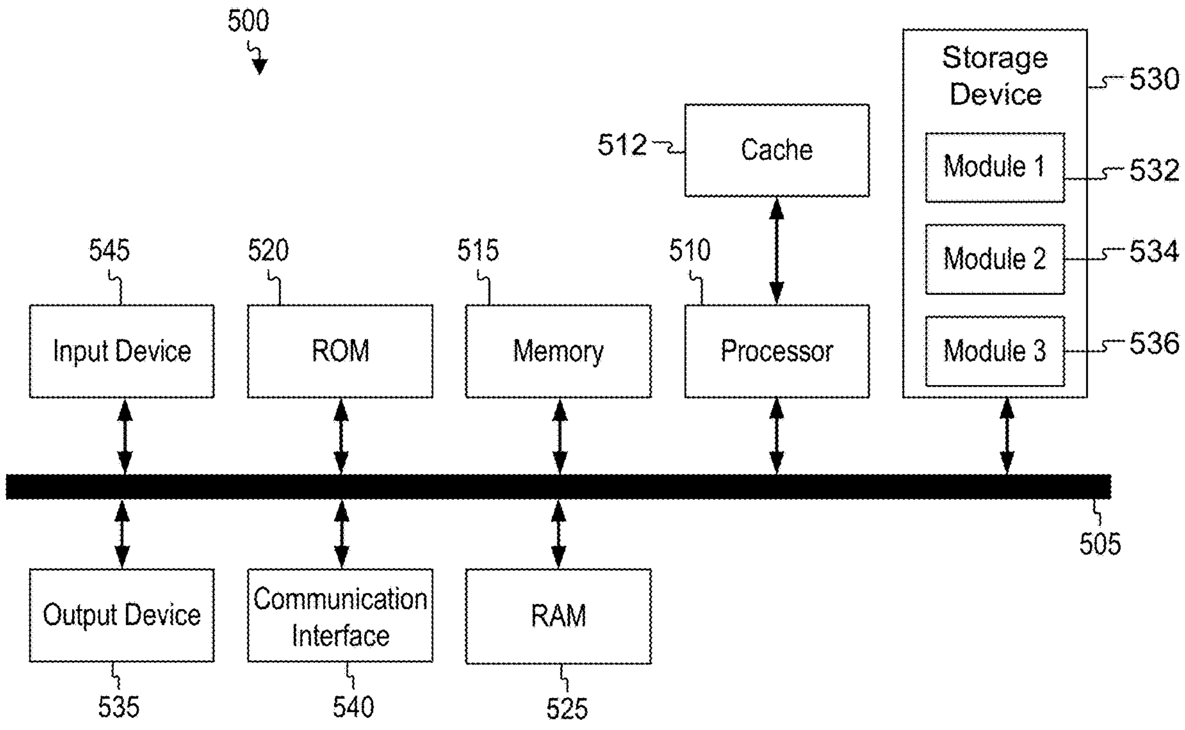
FIG. 5 shows an example of computing system, which may be for example any computing device that may implement components of the system.

FIG. 5 shows an example of computing system 500, which may be for example any computing device making up an AP actor, STA actor, or any component thereof in which the components of the system are in communication with each other using connection 505. Connection 505 may be a physical connection via a bus, or a direct connection into processor 510, such as in a chipset architecture. Connection 505 may also be a virtual connection, networked connection, or logical connection.

In some embodiments computing system 500 is a distributed system in which the functions described in this disclosure may be distributed within a datacenter, multiple datacenters, a peer network, etc. In some embodiments, one or more of the described system components represents many such components each performing some or all of the function for which the component is described. In some embodiments, the components may be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 may include a cache of high-speed memory 512 connected directly with, in close proximity to, or integrated as part of processor 510.

Processor 510 may include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which may represent any number of input mechanisms, such as a microphone for speech, a touch-sensitive screen for gesture or graphical input, keyboard, mouse, motion input, speech, etc. Computing system 500 may also include output device 535, which may be one or more of a number of output mechanisms known to those of skill in the art. In some instances, multimodal systems may enable a user to provide multiple types of input/output to communicate with computing system 500. Computing system 500 may include communications interface 540, which may generally govern and manage the user input and system output. There is no restriction on operating on any particular hardware arrangement and therefore the basic features here may easily be substituted for improved hardware or firmware arrangements as they are developed.

Storage device 530 may be a non-volatile memory device and may be a hard disk or other types of computer readable media which may store data that are accessible by a computer, such as magnetic cassettes, flash memory cards, solid state memory devices, digital versatile disks, cartridges, random access memories (RAMs), read only memory (ROM), and/or some combination of these devices.

The storage device 530 may include software services, servers, services, etc., that when the code that defines such software is executed by the processor 510, it causes the system to perform a function. In some embodiments, a hardware service that performs a particular function may include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a STA actor device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

Aspect 1. A method of providing joint transmission for a wireless connection, the method comprising: establishing an upper upper medium access controller (upper UMAC); establishing a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY);

transmitting one or more proto-medium access controller protocol data units (proto-MPDUs) from the upper UMAC to the plurality of AP actors; attaching PHY and MAC metadata to the one or more proto-MPDUs; and forming, at each of the plurality of AP actors, a PHY protocol data unit (PPDU), wherein each PPDU is formed from a corresponding one of the one or more proto-MPDUs.

Aspect 2. The method of Aspect 1, further comprising forming an aggregated MAC protocol data unit (AMPDU) according to MAC metadata, wherein the AMPDU can include one or more MPDUs.

Aspect 3. The method of Aspect 2, wherein the forming a PPDU includes one AMPDU.

Aspect 4. The method of any of Aspects 1 to 3, wherein the upper UMAC is on a separate device from the AP actor.

Aspect 5. The method of any of Aspects 1 to 4, further comprising sending additional MAC metadata and PHY metadata in a header for the proto-MPDU.

Aspect 6. The method of Aspect 5, wherein each PHY collocated with a corresponding LMAC applies steering matrices based upon one or more of the additional MAC metadata and/or PHY metadata.

Aspect 7. The method of Aspect 6, wherein each PHY transmits a beamformed PPDU at a same time.

Aspect 8. The method of Aspect 5, wherein the additional MAC metadata and PHY metadata includes an assigned identifier that is unique across STA actors and a plurality of nearby AP actors within a predetermined timestamp.

Aspect 9. The method of Aspect 5, wherein the additional MAC metadata and PHY metadata includes an assigned identifier that is unique across STA actors and a plurality of nearby AP actors within a predetermined neighborhood.

Aspect 10. The method of Aspect 9, wherein the plurality of nearby AP actors perform a sounding to obtain steering matrices.

Aspect 11. The method of any of Aspects 9 to 10, wherein the plurality of nearby AP actors initially synchronize to a trigger frame.

Aspect 12. The method of Aspect 11, wherein each lower UMAC forms MPDUs and AMPDUs according to the MAC metadata associated with the assigned identifier and overriding MAC metadata in the trigger frame.

Aspect 13. A system includes a storage (implemented in circuitry) configured to store instructions and a processor. The processor configured to execute the instructions and cause the processor to: establish an upper upper medium access controller (upper UMAC); establish a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmit one or more proto-medium access controller protocol data units (proto-MPDUs) from the upper UMAC to the plurality of AP actors; attaching PHY and MAC metadata to the one or more proto-MPDUs; and form, at each of the plurality of AP actors, a PHY protocol data unit (PPDU), wherein each PPDU is formed from a corresponding one of the one or more proto-MPDUs.

Aspect 14. The system of Aspect 13, further comprising forming an aggregated MAC protocol data unit (AMPDU) according to MAC metadata, wherein the AMPDU can include one or more MPDUs.

Aspect 15. The system of Aspect 14, wherein the forming a PPDU includes one AMPDU.

Aspect 16. The system of any of Aspects 13 to 15, wherein the upper UMAC is on a separate device from the AP actor.

Aspect 17. The system of any of Aspects 13 to 16, further comprising sending additional MAC metadata and PHY metadata in a header for the proto-MPDU.

Aspect 18. The system of Aspect 17, wherein each PHY collocated with a corresponding LMAC applies steering matrices based upon one or more of the additional MAC metadata and/or PHY metadata.

Aspect 19. The system of Aspect 18, wherein each PHY transmits a beamformed PPDU at a same time.

Aspect 20. The system of Aspect 17, wherein the additional MAC metadata and PHY metadata includes an assigned identifier that is unique across STA actors and a plurality of nearby AP actors within a predetermined timestamp.

Aspect 21. The system of Aspect 17, wherein the additional MAC metadata and PHY metadata includes an assigned identifier that is unique across STA actors and a plurality of nearby AP actors within a predetermined neighborhood.

Aspect 22. The system of Aspect 21, wherein the plurality of nearby AP actors perform a sounding to obtain steering matrices.

Aspect 23. The system of any of Aspects 21 to 22, wherein the plurality of nearby AP actors initially synchronize to a trigger frame.

Aspect 24. The system of Aspect 23, wherein each lower UMAC forms MPDUs and AMPDUs according to the MAC metadata associated with the assigned identifier and overriding MAC metadata in the trigger frame.

Aspect 25. A computer readable medium comprising instructions using a computer system. The computer includes a memory (e.g., implemented in circuitry) and a processor (or multiple processors) communicatively coupled to the memory. The processor (or processors) is configured to execute the computer readable medium and cause the processor to: establish an upper upper medium access controller (upper UMAC); establish a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY); transmit one or more proto-medium access controller protocol data units (proto-MPDUs) from the upper UMAC to the plurality of AP actors; attaching PHY and MAC metadata to the one or more proto-MPDUs; and form, at each of the plurality of AP actors, a PHY protocol data unit (PPDU), wherein each PPDU is formed from a corresponding one of the one or more proto-MPDUs.

Aspect 26. The computer readable medium of Aspect 25, further comprising forming an aggregated MAC protocol data unit (AMPDU) according to MAC metadata, wherein the AMPDU can include one or more MPDUs.

Aspect 27. The computer readable medium of Aspect 26, wherein the forming a PPDU includes one AMPDU.

Aspect 28. The computer readable medium of any of Aspects 25 to 27, wherein the upper UMAC is on a separate device from the AP actor.

Aspect 29. The computer readable medium of any of Aspects 25 to 28, further comprising sending additional MAC metadata and PHY metadata in a header for the proto-MPDU.

Aspect 30. The computer readable medium of Aspect 29, wherein each PHY collocated with a corresponding LMAC applies steering matrices based upon one or more of the additional MAC metadata and/or PHY metadata.

Aspect 31. The computer readable medium of Aspect 30, wherein each PHY transmits a beamformed PPDU at a same time.

Aspect 32. The computer readable medium of Aspect 29, wherein the additional MAC metadata and PHY metadata includes an assigned identifier that is unique across STA actors and a plurality of nearby AP actors within a predetermined timestamp.

Aspect 33. The computer readable medium of Aspect 29, wherein the additional MAC metadata and PHY metadata includes an assigned identifier that is unique across STA actors and a plurality of nearby AP actors within a predetermined neighborhood.

Aspect 34. The computer readable medium of Aspect 33, wherein the plurality of nearby AP actors perform a sounding to obtain steering matrices.

Aspect 35. The computer readable medium of any of Aspects 33 to 34, wherein the plurality of nearby AP actors initially synchronize to a trigger frame.

Aspect 36. The computer readable medium of Aspect 35, wherein each lower UMAC forms MPDUs and AMPDUs according to the MAC metadata associated with the assigned identifier and overriding MAC metadata in the trigger frame.

What is claimed is:

1. A method of providing joint transmission for a wireless connection, the method comprising:

establishing an upper upper medium access controller (upper UMAC);

establishing a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY), and wherein establishing the connection includes maintaining the upper UMAC for the STA actor while adding one or more lower UMACs associated with different AP actors of the plurality of AP actors as the STA actor moves relative to the plurality of AP actors;

transmitting one or more proto-medium access controller protocol data units (proto-MPDUs) from the upper UMAC to the plurality of AP actors;

attaching PHY and MAC metadata to the one or more proto-MPDUs; and forming, at each of the plurality of AP actors, a PHY protocol data unit (PPDU), wherein each PPDU is formed from a corresponding one of the one or more proto-MPDUs.

2. The method of claim 1, further comprising forming an aggregated MAC protocol data unit (AMPDU) according to MAC metadata, wherein the AMPDU can include one or more MPDUs.

3. The method of claim 2, wherein the forming a PPDU includes one AMPDU.

4. The method of claim 1, wherein the upper UMAC is on a separate device from the AP actor.

5. The method of claim 1, further comprising sending additional MAC metadata and PHY metadata in a header for the proto-MPDU.

6. The method of claim 5, wherein each PHY collocated with a corresponding LMAC applies steering matrices based upon one or more of the additional MAC metadata and/or PHY metadata.

7. The method of claim 6, wherein each PHY transmits a beamformed PPDU at a same time.

8. The method of claim 5, wherein the additional MAC metadata and PHY metadata includes an assigned identifier that is unique across STA actors and a plurality of nearby AP actors within a predetermined timestamp.

9. The method of claim 5, wherein the additional MAC metadata and PHY metadata includes an assigned identifier that is unique across STA actors and a plurality of nearby AP actors within a predetermined neighborhood.

10. The method of claim 9, wherein the plurality of nearby AP actors perform a sounding to obtain steering matrices.

11. The method of claim 9, wherein the plurality of nearby AP actors initially synchronize to a trigger frame.

12. The method of claim 11, wherein each lower UMAC forms MPDUs and AMPDUs according to the MAC metadata associated with the assigned identifier and overriding MAC metadata in the trigger frame.

13. A system comprising:

a storage configured to store instructions; and a processor configured to execute the instructions and cause the processor to:

establish a connection, between an upper upper medium access controller (upper UMAC) and a station (STA) actor, over a plurality of access point actors (AP actors), wherein each of the AP actors includes a lower upper medium access controller (UMAC), a lower medium access controller (LMAC), and a physical layer (PHY), and wherein establishing the connection includes maintaining the upper UMAC for the STA actor while adding one or more lower UMACs associated with different AP actors of the plurality of AP actors as the STA actor moves relative to the plurality of AP actors;

transmit one or more proto-medium access controller protocol data units (proto-MPDUs) from the upper UMAC to the plurality of AP actors;

attach PHY and MAC metadata to the one or more proto-MPDUs; and form, at each of the plurality of AP actors, a PHY protocol data unit (PPDU), wherein each PPDU is formed from a corresponding one of the one or more proto-MPDUs.

14. The system of claim 13, wherein the processor is configured to execute the instructions and cause the processor to: form an aggregated MAC protocol data unit (AMPDU) according to MAC metadata, wherein the AMPDU can include one or more MPDUs.

15. The system of claim 14, wherein the forming a PPDU includes one or more AMPDUs.

16. The system of claim 13, wherein the processor is configured to execute the instructions and cause the processor to: send additional MAC metadata and PHY metadata in a header for the proto-MPDU.

17. The system of claim 16, wherein each PHY collocated with a corresponding LMAC applies steering matrices based upon one or more of the additional MAC metadata and/or PHY metadata.

18. The system of claim 17, wherein each PHY transmits a beamformed PPDU at a same time.

19. The system of claim 16, wherein the additional MAC metadata and PHY metadata includes an assigned identifier that is unique across STA actors and a plurality of nearby AP actors within a predetermined neighborhood.

20. A non-transitory computer readable medium comprising instructions, the instructions, when executed by a computing system, cause the computing system to:

establish an upper upper medium access controller (upper UMAC);

establish a connection, between the upper UMAC and a station (STA) actor, over a plurality of access point actors (AP actors), wherein each of the AP actors includes a lower upper medium access controller (UMAC), a lower medium access controller (LMAC), and a physical layer (PHY), and wherein establishing the connection includes maintaining the upper UMAC for the STA actor while adding one or more lower UMACs associated with different AP actors of the plurality of AP actors as the STA actor moves relative to the plurality of AP actors;

transmit one or more proto-medium access controller protocol data units (proto-MPDUs) from the upper UMAC to the plurality of AP actors;

attaching PHY and MAC metadata to the one or more proto-MPDUs; and form, at each of the plurality of AP actors, a PHY protocol data unit (PPDU), wherein each PPDU is formed from a corresponding one of the one or more proto-MPDUs.

* * * * *